United States Patent

Mizuno

Patent Number: 5,442,487
Date of Patent: Aug. 15, 1995

[54] OPHTHALMIC PHOTOCOAGULATING APPARATUS USING A LASER DIODE AND A LENS SYSTEM FOR THE APPARATUS

[75] Inventor: Katsuyasu Mizuno, Gamagori, Japan

[73] Assignee: Nidek Co., Ltd., Aichi, Japan

[21] Appl. No.: 7,828

[22] Filed: Jan. 22, 1993

Related U.S. Application Data

[63] Continuation of Ser. No. 683,154, Apr. 10, 1991, abandoned.

[30] Foreign Application Priority Data

Apr. 12, 1990 [JP] Japan .................. 2-96949

[51] Int. Cl.$^6$ ............ G02B 9/12; G03B 13/06; A61N 5/06
[52] U.S. Cl. ............... 359/784; 359/362; 359/434; 606/4
[58] Field of Search ............... 359/205–207, 359/362–363, 642, 662–664, 672–679, 196–221, 367, 434–435, , 754, 771–772, 779–780, 784, 792, 399, 641, 858; 372/6, 32, 34, 36, 101; 351/205–214, 243, 247

[56] References Cited

U.S. PATENT DOCUMENTS

| | | | |
|---|---|---|---|
| 3,625,585 | 12/1971 | Belser | 359/858 |
| 3,703,176 | 11/1972 | Vassiliadis et al. | 128/395 |
| 4,203,652 | 5/1980 | Hanada | 359/641 |
| 4,235,507 | 11/1980 | Kataoka | 359/399 |
| 4,253,724 | 3/1981 | Minoura et al. | 359/206 |
| 4,253,735 | 3/1981 | Kawamura et al. | 359/205 |
| 4,281,889 | 8/1981 | Noguchi | 359/217 |
| 4,397,310 | 8/1983 | Pomerantzeff | 372/6 |
| 4,563,056 | 1/1986 | Tagawa et al. | 359/205 |
| 4,705,367 | 11/1987 | Eckbreth et al. | 359/434 |
| 4,776,654 | 10/1988 | Ishizuka | 359/205 |
| 4,893,008 | 1/1990 | Horikawa | 359/205 |
| 4,917,486 | 4/1990 | Raven et al. | 351/221 |
| 4,932,734 | 6/1990 | Sakuma et al. | 359/207 |
| 5,171,242 | 12/1992 | Dewey et al. | 359/823 |

FOREIGN PATENT DOCUMENTS

| | | |
|---|---|---|
| 0310711 | 4/1989 | European Pat. Off. |
| 0363221 | 4/1990 | European Pat. Off. |
| 2643364 | 4/1977 | Germany |
| 2917221 | 11/1979 | Germany |
| 7925899 | 2/1980 | Germany |
| 3703679 | 8/1987 | Germany |
| 3724282 | 2/1989 | Germany |
| 25120 | 2/1986 | Japan ............ 359/399 |
| 109015 | 5/1986 | Japan ............ 359/668 |

OTHER PUBLICATIONS

"Phased Array Diode Lasers", Streifer et al, Laser Focus, Jun. 1984.

Primary Examiner—Paul M. Dzierzynski
Assistant Examiner—Thong Nguyen
Attorney, Agent, or Firm—Nikaido, Marmelstein, Murray & Oram

[57] ABSTRACT

A lens system disposed between the emitting area of a laser diode and a focal plane for focusing the output beam of the laser diode on the focal plane is disclosed, in which system, as regards a direction parallel to the lengthwise direction of the emitting area of the laser diode, the emitting area and the focal plane are conjugate, and a telescopic optical system is formed of the lens system to form a telescopic image indicative of the exit pupil of the lens system at an infinite distance and to make small the convergent angle of the laser beam incident on the focal plane.

5 Claims, 5 Drawing Sheets

FIG. I
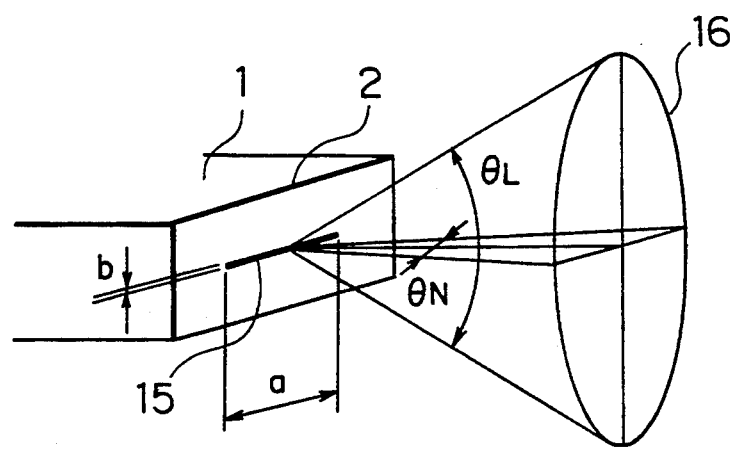

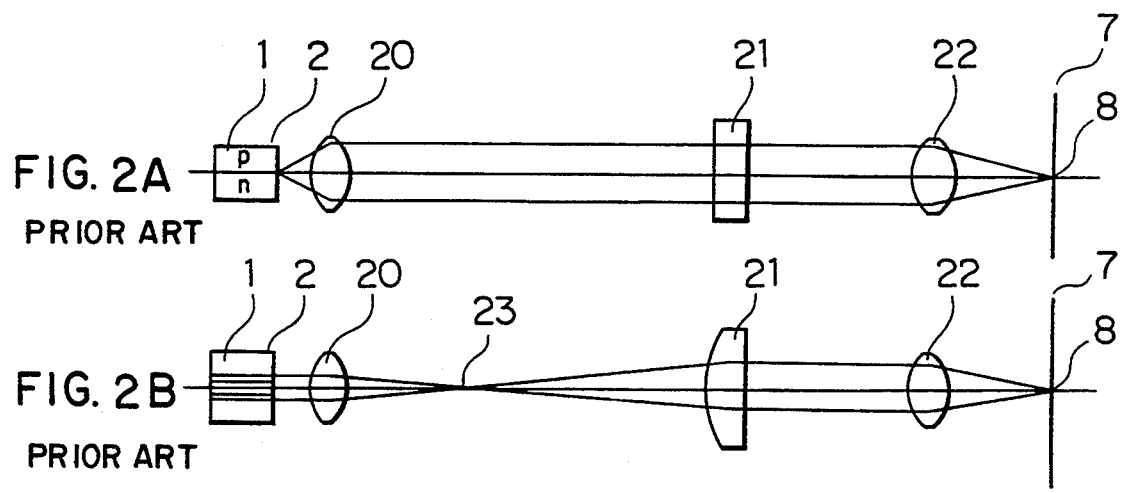
FIG. 2A PRIOR ART
FIG. 2B PRIOR ART
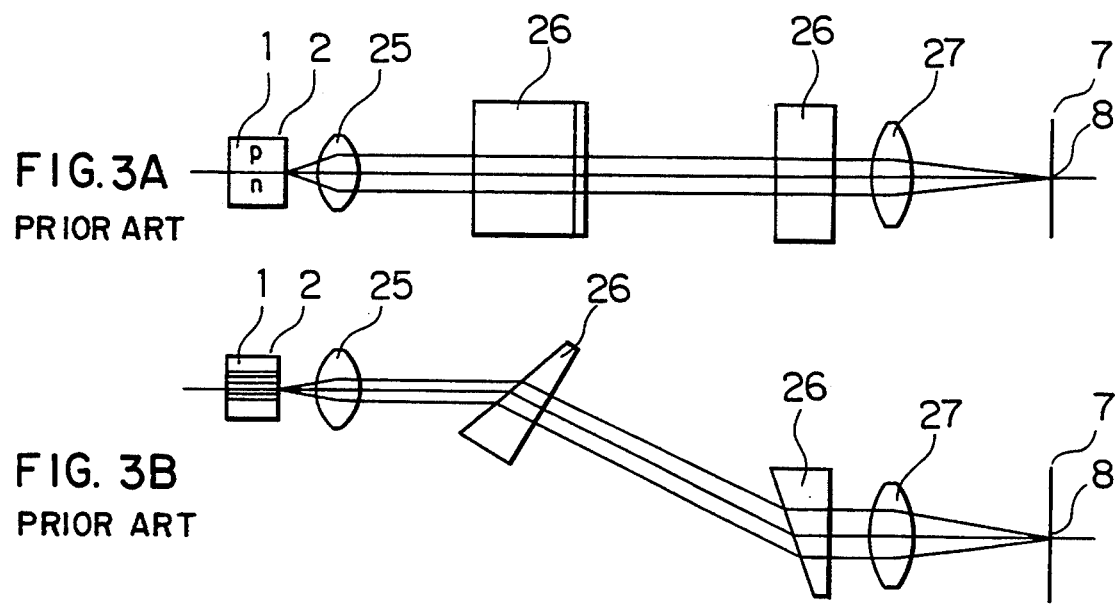
FIG. 3A PRIOR ART
FIG. 3B PRIOR ART

OPHTHALMIC PHOTOCOAGULATING APPARATUS USING A LASER DIODE AND A LENS SYSTEM FOR THE APPARATUS

This application is a continuation of application Ser. No. 07/683,154, filed Apr. 10, 1991, now abandoned.

FIELD OF THE INVENTION

The present invention relates to a semiconductor laser diode, and more particularly to a lens system for focusing the output beam of a high-power laser diode on the input face of an optical fiber or a pinhole.

BACKGROUND OF THE INVENTION

Recently, a high-power laser diode having output power of about 1W and made of GaAlAs laser diode, has been put on sale. The optical characteristics of such a high-power laser diode will be explained below, with reference to FIG. 1. Referring to FIG. 1, a laser diode 1 is set in a package (not shown), and a laser beam is emitted from a window of the package. Now, a case where a laser diode has maximum output power of 1W, will be explained, by way of example. In this case, the width a of a light emitting area in the lengthwise direction of an emitting area 15 (hereinafter referred to as "parallel direction") is 200 μm, and the height b of the light emitting area in the direction perpendicular to the lengthwise direction of the emitting area 15 (hereinafter referred to as "perpendicular direction") is 1 μm. Further, when a beam divergence indicative of the size of a far field pattern is given by full width at half maximum (FWHM), a beam divergence $\theta_{//}$ in the parallel direction is about 10° and a beam divergence $\theta_\perp$ in the perpendicular direction is about 40°. In other words, in the perpendicular direction, the height b of the emitting area 15 is 1 μm, and thus the emitting area t5 can be almost regarded as a point source. While, in the parallel direction, the width a of the emitting area 15 is 200 μm, and moreover the output beam isn't spatially coherent but it seems to be emitted like a filament. This fact will be a serious obstacle when the output beam of the high-power laser diode is intended to be focused on a small spot.

Two kinds of lens systems have hitherto been known which are used for focusing the output beam of a high-power laser diode. A first one of the conventional lens systems will first be explained, with reference to FIGS. 2A and 2B.

FIG. 2A is a sectional view of the first conventional lens system taken along the perpendicular direction. Referring to FIG. 2A, the emitting area 15 of a laser diode 1 is projected on a focal plane 7 by a collimating lens 20 and a focusing lens 22. FIG. 2B is a sectional view of the first conventional lens system taken along the parallel direction. Referring to FIG. 2B, a far field pattern 16 (FIG. 1) of the laser diode 1 is formed at the focal point 23 of the collimating lens 20, and the above image is projected on the focal plane 7 by a cylindrical convergent lens 21, having refracting power only in the parallel direction, and the focusing lens 22.

Next, a second one of the conventional lens systems will be explained, with reference to FIGS. 3A and 3B. FIG. 3A is a sectional view of the second conventional lens system taken along the perpendicular direction. Referring to FIG. 3A, as in the first conventional lens system, the emitting area 15 of the laser diode 1 is projected on the focal plane 7 by a collimating lens 25 and a focusing lens 27. FIG. 3B is a sectional view of the second conventional lens system taken along the parallel direction. Referring to FIG. 3B, although the emitting area 15 of the laser diode 1 is projected on the focal plane 7 by the collimating lens 25 and the focusing lens 27 as in the perpendicular direction, a beam expander made up of a pair of prisms 26 is disposed between the collimating lens 25 and the focusing lens 27, and thus the projection magnification in the parallel direction is lower then that in the perpendicular direction.

A drawback of the first conventional lens system will first be explained. In the parallel direction, a far field pattern 16 of the laser diode 1 is projected on the focal plane 7. Hence, the size of a beam spot 8 which is formed on the focal plane 7, in the parallel direction is determined by the size of the far field pattern 16 in the parallel direction, that is, by the beam divergence $\theta_{//}$ in the parallel direction. In general, $\theta_{//}$ increases as the output power of the laser diode 1 is larger. Accordingly, in a case where the input face of an optical fiber or a pinhole is placed on the focal plane 7, the transmittance of the optical fiber or the pinhole decreases as the output power of the laser diode 1 is made larger.

Incidentally, in the second conventional lens system, the emitting area 15 of the laser diode 1 is projected on the focal plane 7 in both of the parallel and perpendicular directions. Even when the output power of the laser diode 1 is increased, the size of the emitting area 15 at the output face 2 of the laser diode 1 will be kept substantially constant, and thus the size of the beam spot 8 will also be kept substantially constant.

Next, a drawback of the second conventional lens system will be explained. Let us consider a case where the input face of an optical fiber or a pinhole is placed on the focal plane 7, and an additional lens system is disposed behind the output face of the optical fiber or the pinhole. When the laser beam incident on the focal plane 7 has a small covergent angle, the laser beam emerging from the optical fiber or the pinhole has a small divergent angle. Accordingly, a lens system having a small numerical aperture can be used as the additional lens system disposed behind the optical fiber or the pinhole. That is, in many cases, it is advantageous that the laser beam incident on the focal plane 7 has a small convergent angle. In the second conventional lens system, however, the laser beam incident on the focal plane 7 has a large convergent angle in the parallel direction for the following reason.

FIG. 4 is a sectional view of the laser diode 1 taken along the parallel direction. Referring to FIG. 4, contours BC and BG of laser beam emitted from a point B which is deviated from an optical axis AF, are parallel to contours AD and AH of laser beam emitted from a point A on the optical axis AF, respectively, and principal ray BE of the laser beam emitted from the point B is parallel to the optical axis AF. The divergent angle of that one of laser beam incident on the focal plane 7 which is emitted from the point A on the optical axis AF, is determined only by the divergence angle ∠DAH of the laser beam and the projection magnification of the lens system. Although it is impossible to make the convergent angle of the total laser beam incident on the focal plane 7 smaller than that of the laser beam which is emitted from the point A and is incident on the focal plane 7, the convergent angle of the former laser beam can be reduced to that of the latter laser beam by making the principal ray BE parallel to the optical axis in the focal plane 7, that is, by forming a telescopic optical system of the lens system in the parallel direction. Conversely speaking, when the telescopic optical system is not formed of the lens system, the convergent angle of the laser beam incident on the focal plane 7 becomes large unnecessarily. In order to form a telescopic optical system of the second conventional lens system in the parallel direction shown in FIG. 3B, it is required to dispose the collimating lens 25 and the focusing lens 27 so that these focuses agree with each other. However, each of collimating lens 25 and focusing lens 27 usually has a short focal distance, and moreover the beam expander 26 is disposed between the lenses 25 and 27. Accordingly, it is very difficult to form a telescopic optical system of the lens system shown in FIG. 3B, and thus the laser beam incident on the focal plane 7 is obliged to have a large convergent angle. Although the second conventional lens system in the parallel direction has been explained in the above, the light emitting area in the perpendicular direction can be regarded as a point source. Accordingly, in the perpendicular direction, it is unnecessary to consider the above-mentioned principal ray.

SUMMARY OF THE INVENTION

It is an object of the present invention to provide a lens system for focusing the output beam of a high-power laser diode on a small spot so that a laser beam having a small convergence angle is incident on the small spot.

In order to attain the above object, according to a first aspect of the present invention, there is provided a lens system disposed between the emitting area of a laser diode and a focal plane for focusing the output beam of the laser diode on the focal plane, in which system, as regards a direction parallel to the lengthwise direction of the emitting area of the laser diode, the emitting area and the focal plane are conjugate, and a telescopic optical system is formed of the lens system to form a far field pattern indicative of the exit pupil of the lens system at an infinite distance.

According to a second aspect of the present invention, there is provided a lens system disposed between the emitting area of a laser diode and a focal plane for focusing the output beam of the laser diode on the focal plane which system comprises: a first lens having a converging action; a second lens having a converging action; and a third lens having a converging action only in a direction parallel to the lengthwise direction of the emitting area of the laser diode, the first, second and third lenses being disposed in the order described in the direction from the laser diode toward the focal plane so that, as regards a direction parallel to the lengthwise direction of the emitting area, an image of the emitting area is formed on the focal plane by the first, second and third lenses and the focal point of the first lens on the light-receiving-plane side and the focal point of the third lens on the laser-diode side are made conjugate by the second lens.

According to a third aspect of the present invention, a lens system according to the second aspect further comprises a fourth lens which is disposed between the first lens and the third lens and has a diverging action only in a vertical direction perpendicular to the lengthwise direction of the emitting area of the laser diode, to make the emitting area and the focal plane conjugate in the-vertical direction too.

Moreover, the term "a first lens" or "a second lens" does not mean a single lens but means a lens composed of a plurality of lens elements with the same performance as a lens.

BRIEF DESCRIPTION OF THE DRAWINGS

FIG. 1 is a perspective view for explaining the optical characteristics of a laser diode;

FIGS. 2A and 2B are sectional view showing a conventional lens system-for focusing the output beam of a laser diode;

FIGS. 3A and 3B are sectional views showing another conventional lens system for focusing the output beam of a laser diode;

DESCRIPTION OF THE PREFERRED EMBODIMENTS

An embodiment of a lens system according to the present invention will be explained below, with reference to FIGS. 5A and 5B.

Figure 4:
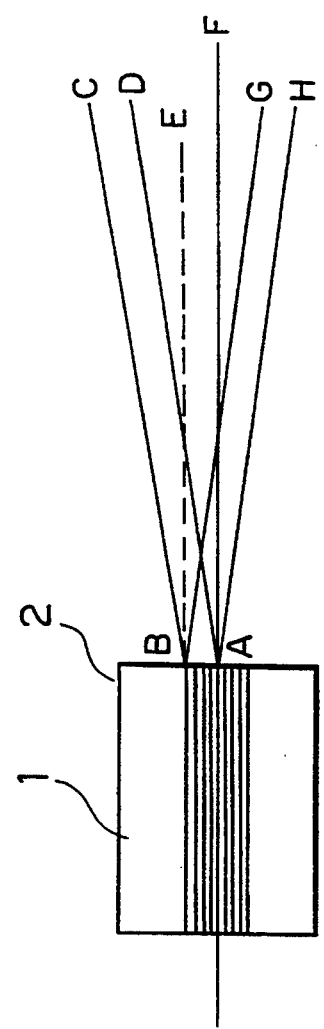
FIG. 4 is a schematic diagram showing light emission from a laser diode.
Figure 5:
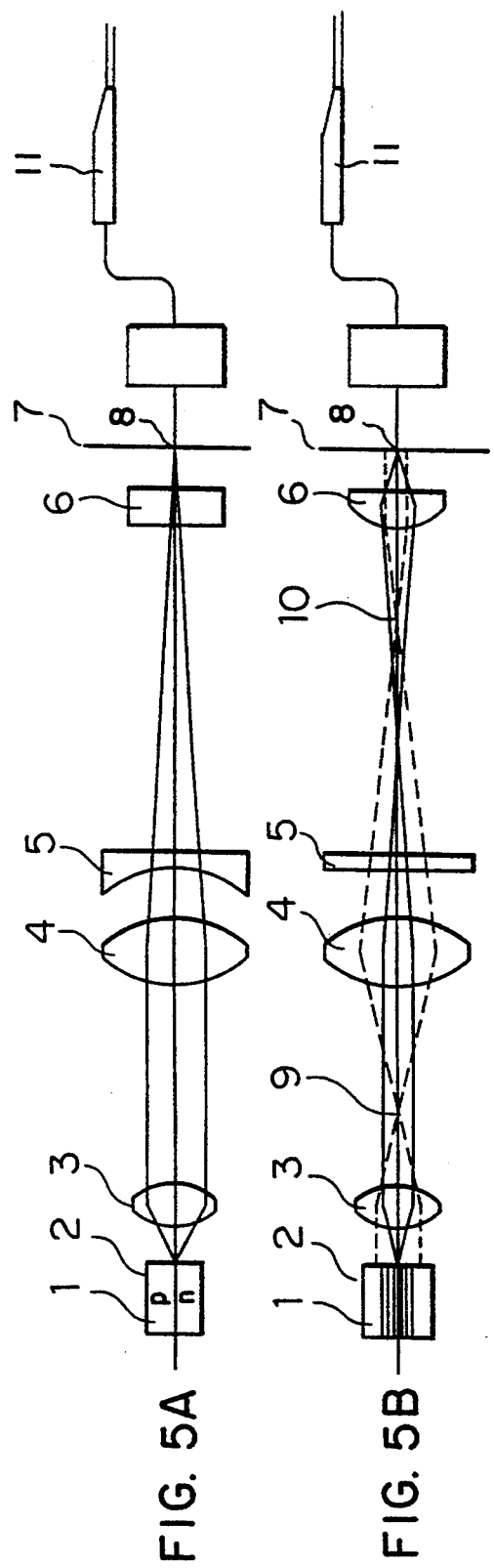
FIGS. 5A and 5B are sectional views showing an embodiment of a lens system for focusing the output beam of a laser diode in accordance with the present invention.

FIG. 5A is a sectional view of the present embodiment taken along the perpendicular direction, and FIG. 5B is a sectional view of the present embodiment taken along the parallel direction.

In FIGS. 5A and 5B, reference numeral 1 designates a laser diode, and 2 an output face of the laser diode 1 and reference numeral 11 designates a photo-probe. The laser beam emitted from the emitting area 15 of the laser diode 1 is focused on the small spot 8 of the focal plane 7 through a collimating lens 3, a convex lens 4, a cylindrical concave lens 5-and a cylindrical convex lens 6.

In the parallel direction, as shown in FIG. 5B, the laser beam emitted from the emitting area 15 of the laser diode 1 is focused on the small spot 8, and moreover the focus 9 of the collimating lens 3 on the side of the focal plane 7 and the focus 10 of the cylindrical convex lens 6 on the side of the laser diode 1 are conjugate by the convex lens 4. That is, in the parallel direction, a telescopic optical system is formed of the present embodiment.

Incidentally, the convex lens 4 is not limited to a single lens, but may be made up of a plurality of lenses.

In the perpendicular direction, as shown in FIG. 5A, the emitting area 15 and the focal plane 7 are made conjugate by the diverging action of the cylindrical concave lens 5, and thus the laser beam emitted from the emitting area 15 is focused on the small spot 8. It is to be noted that the projection magnification of the emitting area 15 is larger in the perpendicular direction than in the parallel direction. This fact will compensate for the difference between the beam divergence in the perpendicular direction and the beam divergence in the parallel direction.

Next, explanation will be made of an example of an apparatus provided with a lens system according to the present invention.

Figure 6:
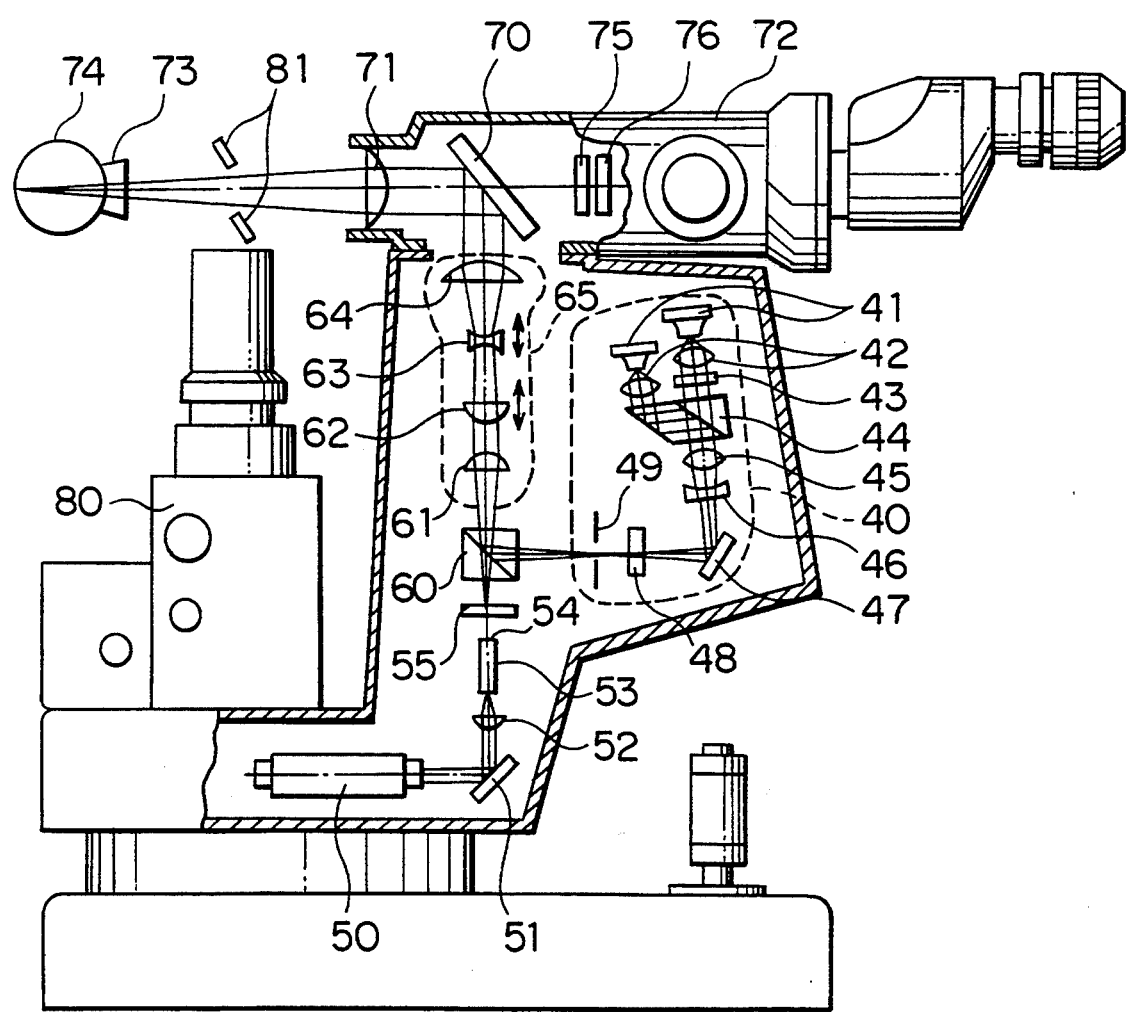
FIG. 6 is a diagram, partly in cross section and partly pictorial, of an embodiment of an apparatus for transpupiliary retinal photocoagulation to which the present invention is applied.

FIG. 6 shows an apparatus for transpupillary retinal photocoagulation, which includes a lens system according to the present invention and a slit-lamp microscope. In this apparatus, a pair of high-power laser diodes 41 are used as a light source for photocoagulation. Each laser diode 41 is made of GaAlAs laser diode, and emits a laser beam having a wavelength of about 800 nm.

An optical system 40 according to the present invention will first be explained. The output beams of the laser diodes 41 are collimated by a pair of collimating lenses 42 having a large numerical aperture, and are then combined by a halfwave plate 43 and a polarizing beam combiner 44 so as to have the same optical axis. In the perpendicular direction (parallel to paper, on which FIG. 6 is drawn), the output face of each laser diode 41 is projected on a pinhole 49 by the collimating lens 42, a convex lens 45 and a cylindrical concave lens 46 having refracting power only in the perpendicular direction. While, in the parallel direction (perpendicular to the above paper), the emitting area of each laser diode 41 is projected on the pinhole 49 by the collimating lens 42, the convex lens 45, a mirror 47 and a cylindrical convex lens 48 having refracting power only in the parallel direction. Further, the focus of the collimating lens 42 on the side of the pinhole 49 and the focus of the cylindrical convex lens 48 on the side of the laser diodes 41 are made conjugate by the convex lens 45. Thus, in the parallel direction, a telescopic optical system is formed of that portion of the optical system 40 which starts from the collimating lenses 42 and terminates at the cylindrical convex lens 48.

The laser beam for photocoagulation has a wavelength of about 800 nm, and human eyes are insensitive to this laser beam. Hence, a He-Ne laser 50 for emitting laser beam having a wavelength of 633 nm is used as an aiming light source. Aiming light emitted from the laser 50 is reflected by a mirror 51, and is then incident on an optical fiber 53 through a focusing lens 52. The optical fiber 53 is disposed so that the output end 54 thereof and the pinhole 49 are mirror images each other with respect to a dichroic mirror 60.

The laser beam for photocoagulation and the laser beam for aiming are combined by the dichroic mirror 60 so as to have the same optical axis. The combined laser thus obtained passes through a zoom system 65 made up of a collimating lens 61, a compensator 62, a variator 63 and a collimating lens 64, and is then reflected by a dichroic mirror 70 so that the optical axis of the reflected laser beam coincides with that of a slit-lamp microscope 72. A wavelength component of 800 nm is perfectly reflected by the dichroic mirror 70, and 50% of visible rays is reflected by the mirror 70. The laser beam reflected by the mirror 70 passes through the objective lens 71 of the microscope 72, and is then led to the fundus of a patient's eye 74 provided with a contact lens 73. The pinhole 49 and the output end 54 of the optical fiber are conjugate to the object plane of the microscope 72, and moreover the pinhole 49 and the core of the optical fiber 53 have the same diameter. Thus, an operator can observe by the microscope 72 that a circular light spot having a well-defined edge is formed on the fundus of the patient's eye 74 by the laser beam for aiming, that is, when the positional relation between the photocoagulation apparatus and the patient's eye is adjusted so that an image of the core of the optical fiber 53 is formed on the fundus of the patient's eye, the laser beam for photocoagulation forms an invisible, circular spot having a well-defined edge on the fundus of the patient's eye which spot has the same shape and size as the above image due to the aiming laser beam. Further, when the operator drives the zoom system 65 with the aid of a mechanism such as a cam (not shown), the size of the circular spot for photocoagulation can be continuously varied while keeping the conjugate relation between the object plane of the microscope 72 and each of the pinhole 49 and the output end 54 of the optical fiber 53, and forming a circular spot having a well-defined edge at the fundus of the patient's eye.

Further, polarizers 55 and 75 are disposed so that the polarizing direction of the polarizer 55 is perpendicular to that of the polarizer 75. Thus, stray light due to the aiming laser beam reflected by the objective lens 71 will never disturb the observation of the operator. Additionally, a protection filter 76 which absorbs a wavelength component of 800 nm and transmits visible rays, protects the operator's eye against the photocoagulation laser beam reflected by the fundus of the patient's eye 74.

Light from an illumination system 80 of the slit-lamp microscope is led to the patient's eye 74 through a mirror 81, where the illumination light is separated into upper and lower portions so as to transmitted laser beam.

According to the above-mentioned, photocoagulation apparatus, the divergent angle of the laser beam for photocoagulation emerging from the pinhole 49 can be made small. Accordingly, the numerical aperture of the zoom system 65 can be made small, and convergent angle of the laser beam for photocoagulation incident on the patient's eye 74 can be made small. Thus, there is little possibility of the irradiation to the iris of the patient's eye 74 with the laser beam for photocoagulation.

As has been explained in the foregoing, according to the present invention, the output beam of a high-power laser diode can be focused on a small spot in such a manner that laser beam having a small convergent angle is incident on the small spot.

I claim:

1. A lens system disposed between an emitting area of a laser diode and a light beam collecting surface, said lens system concentrates an output light beam of the laser diode on the light beam collecting surface, the lens system comprising:
   a first lens having a converging action on said output light beam;
   a second lens having a converging action on said output light beam; and
   a third lens having a converging action on said output light beam only on a part of said output light beam which is in a direction of a longer side of the emitting area of the laser diode,
   the first, second and third lenses being disposed in order in a direction from the laser diode toward the light beam collecting surface, wherein on said part of said output light beam which is in the direction of the longer side of the emitting area, the emitting area and the light beam collecting surface direction of said output light beam are made conjugate by the first, second and third lenses, and a focus of the first lens on said light beam collecting surface side and a focus of the third lens on a laser-diode side are made conjugate by the second lens.

2. A lens system according to claim 1, further comprising a fourth lens which is disposed between said second lens and said third lens and has a diverging action only in a direction of a shorter side of said emitting area of said laser diode, so as to make said emitting area and said laser beam collecting surface conjugate in the direction of said shorter side.

3. A lens system according to claim 2, wherein said lens system is utilized as a part of an optical system for a laser operation apparatus.

4. An ophthalmic photocoagulation apparatus comprising:
- a laser diode for emitting a laser diode beam, said laser diode has an emitting area which is a rectangle;
- a lens system disposed between said emitting area of said laser diode and a laser beam collecting surface, said lens system having a cylindrical lens for maintaining said emitting area and said laser beam collecting surface in a conjugative relationship, and said lens system is a telescopic optical system having infinite focal length in a direction of a longer side of said emitting area of said laser diode; and
- a delivery optical system for delivering said laser diode beam from said laser beam collecting surface to a patient's eye, said lens system comprising:
- a first lens having converging action on said laser beam;
- a second lens having a converging action on said laser beam; and
- a third lens having a converging action on said laser beam only on a part of said laser beam which is in a direction of a longer side of the emitting area of the laser diode,
- the first, second and third lenses being disposed in order in a direction from the laser diode toward the laser beam collecting surface, wherein on said part of said laser beam which is in the direction of the longer side of the emitting area, the emitting area and the laser beam collecting surface direction of said laser beam are made conjugate by the first, second and third lenses, and a focus of the first lens on said laser beam collecting surface and a focus of the third lens on a laser diode side are made conjugate by the second lens, and
- a fourth lens which is disposed between the second lens and the third lens and has a diverging action only in a direction of a shorter side of the emitting area of the laser diode, so as to make the emitting area and the laser beam collecting surface conjugate in the direction of the shorter side.

5. An ophthalmic photocoagulation apparatus according to claim 4, wherein said delivery optical system is one of a photo-probe and a slit-lamp microscope.

* * * * *